United States Patent
Braddock et al.

(10) Patent No.: US 10,227,761 B2
(45) Date of Patent: Mar. 12, 2019

(54) ELECTRONIC DRAIN CLOSURE SYSTEM

(71) Applicant: MAAX BATH INC., Lachine (CA)

(72) Inventors: Charles Kerwin Braddock, Ellicott City, MD (US); Thomas Stuart Debaugh, Glen Rock, PA (US)

(73) Assignee: MAAX BATH INC., Lachine, Quebec (CA)

( * ) Notice: Subject to any disclaimer, the term of this patent is extended or adjusted under 35 U.S.C. 154(b) by 98 days.

(21) Appl. No.: 15/610,670

(22) Filed: Jun. 1, 2017

(65) Prior Publication Data

US 2017/0350106 A1    Dec. 7, 2017

Related U.S. Application Data

(60) Provisional application No. 62/344,021, filed on Jun. 1, 2016.

(51) Int. Cl.
| | | |
|---|---|---|
| *E03C 1/22* | (2006.01) | |
| *E03C 1/23* | (2006.01) | |
| *E03C 1/242* | (2006.01) | |
| *F16K 1/02* | (2006.01) | |
| *F16K 31/04* | (2006.01) | |
| *F16K 37/00* | (2006.01) | |

(52) U.S. Cl.
CPC ............ *E03C 1/22* (2013.01); *E03C 1/23* (2013.01); *E03C 1/242* (2013.01); *F16K 1/02* (2013.01); *F16K 31/04* (2013.01); *F16K 31/041* (2013.01); *F16K 37/005* (2013.01); *E03C 2001/2311* (2013.01)

(58) Field of Classification Search
CPC ... E03C 1/22; E03C 1/242; E03C 1/23; E03C 2001/2311; F16K 31/04; F16K 31/041; F16K 31/042; F16K 37/005; F16K 1/02

USPC ... 4/668, 679, 680, 682, 684, 685, 688, 689, 4/690; 251/129.11, 129.12

See application file for complete search history.

(56) References Cited

U.S. PATENT DOCUMENTS

| | | | |
|---|---|---|---|
| 8,146,181 B2 * | 4/2012 | Gaus | A47L 15/4223 137/550 |
| 2005/0060796 A1 * | 3/2005 | Cho | A47K 1/14 4/295 |
| 2015/0276075 A1 * | 10/2015 | Davies | B23P 15/002 251/129.11 |

FOREIGN PATENT DOCUMENTS

CN         204826095 U   * 12/2015

OTHER PUBLICATIONS

Machine Translation for CN204826095U.*

* cited by examiner

*Primary Examiner* — Ian Paquette
(74) *Attorney, Agent, or Firm* — Morgan, Lewis & Bockius LLP

(57) ABSTRACT

A system comprising: a drain fitting securable to a container for containing a liquid and an evacuation drain; and a closure member comprising: a casing; a motion device for moving the casing relative between an open position in which the casing is away from the drain fitting to allow the liquid from flowing from the container into the evacuation drain and a closed position in which the casing abuts against the drain fitting to prevent the liquid from flowing from the container into the evacuation drain; an electrical motor received in the casing for activating the motion device; a communication unit received in the casing for at least receiving a command indicative of one of an opening of the electronic drain closure system and a closure of the electronic drain closure (Continued)

system; and a controller for activating the electrical motor in accordance with the command received by the communication unit.

20 Claims, 11 Drawing Sheets

ELECTRONIC DRAIN CLOSURE SYSTEM

TECHNICAL FIELD

The present invention relates to the field of drains for bathtubs, and more particularly to electronic drains.

BACKGROUND

An automatic bathtub is a bathtub that can be controlled so that the bathtub may be automatically filled with water. For example, an automatic bathtub may be remotely controlled by a user in order to fill the bathtub with water. In order to create automated bathtubs, electronic components such as electronic faucets and electronic drains are required.

An electronic drain comprises an electronic drain closure system that is remotely controlled for selectively opening and closing of the drain. An electronic drain closure system usually comprises a motor connected to a power source and a controller for controlling the motor in order to selectively close and open the drain. However, installing an electronic drain usually requires a technician or a plumber to have access to the bottom of the bathtub in order to electrically connect the electronic drain to a power source, which is both time and cost consuming.

Therefore, there is a need for an improved electronic drain.

SUMMARY

In accordance with a broad aspect, there is provided an electronic drain closure system comprising: a drain fitting securable to an opening present in a container for containing a liquid and to an evacuation drain for evacuating the liquid to be contained in the container; and a closure member movably connected to the drain fitting for selectively opening and closing the drain fitting, the closure member comprising: a casing; a motion device for selectively moving the casing relative to the drain fitting between an open position in which the casing is away from the drain fitting to allow the liquid from flowing from the container into the evacuation drain and a closed position in which the casing abuts against the drain fitting to prevent the liquid from flowing from the container into the evacuation drain; an electrical motor received in the casing for activating the motion device; a communication unit received in the casing for at least receiving a command indicative of one of an opening of the electronic drain closure system and a closure of the electronic drain closure system; and a controller for activating the electrical motor in accordance with the command received by the communication unit.

In one embodiment, the electronic drain closure system further comprises a battery received in the casing for powering at least the electrical motor and the controller.

In one embodiment, the battery is a rechargeable battery.

In one embodiment, the electronic drain closure system further comprises a solar panel installed on the casing for recharging the rechargeable battery.

In one embodiment, the electronic drain closure system further comprises a liquid sensor for detecting a presence of the liquid adjacent the closure member; wherein the controller is further configured for activating the communication unit when the sensor detects the presence of the liquid and deactivating the communication unit when the sensor detects an absence of liquid.

In one embodiment, the liquid sensor is secured to the closure member.

In one embodiment, the motion device comprises a drive screw rotatably secured to the casing, a rotation of the drive screw triggering motion of the casing.

In one embodiment, the drain fitting comprises a first tubular body extending between a first top end and a first bottom end and a first bottom wall secured at the first bottom end of the first tubular body, the first top end being securable to the container and the first bottom end being securable to the evacuation drain, the first bottom wall comprising at least one evacuation aperture for allowing the liquid to flow therethrough and a first threaded hole for receiving the drive screw.

In one embodiment, the drain fitting further comprises a flange projecting from the first top end of the first tubular body.

In one embodiment, the first tubular body comprises at least one first recess extending on an inner face thereof along at least a section of a length thereof.

In one embodiment, the electronic drain closure system further comprises a coupling member insertable into the first tubular body of the drain fitting, the coupling member comprising a second tubular body extending between a second top end and a second bottom end, the coupling member further comprising a second bottom wall secured at the second bottom end and comprising a second threaded hole for receiving therein the drive screw.

In one embodiment, the coupling member further comprises at least first protrusion each receivable into a respective one of the at least one first recess for preventing a rotation of the coupling member relative to the drain fitting.

In one embodiment, the coupling member is fixedly secured to the drain fitting.

In another embodiment, the coupling member is removably secured to the drain fitting.

In one embodiment, the drain fitting further comprises at least one first magnet and the coupling member further comprises at least one second magnet, each one of the at least one first magnet interacting with a respective one of the at least one second magnet for removably securing the coupling member into the drain fitting.

In one embodiment, the second tubular body further comprises at least one second recess on an internal face thereof extending along at least a section of a length thereof.

In one embodiment, the casing comprises a hollow T-shaped body comprising a bottom portion and a top portion and a third bottom wall located at a bottom of the hollow T-shaped body, the third bottom wall being provided with a screw receiving aperture through which the drive screw extends, the electrical motor being inserted into the bottom portion.

In one embodiment, the bottom portion of the hollow T-shaped body comprises at least one second protrusion projecting from an external face thereof, each one of the at least one second protrusion being received into a respective one of the at least one second recess.

In one embodiment, the electronic drain closure system further comprises a gasket surrounding the bottom portion of the closure member for substantially hermetically close the drain fitting when the closure member is in the closed position.

In one embodiment, the electronic drain closure system further comprises a cover for covering the hollow T-shaped body.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
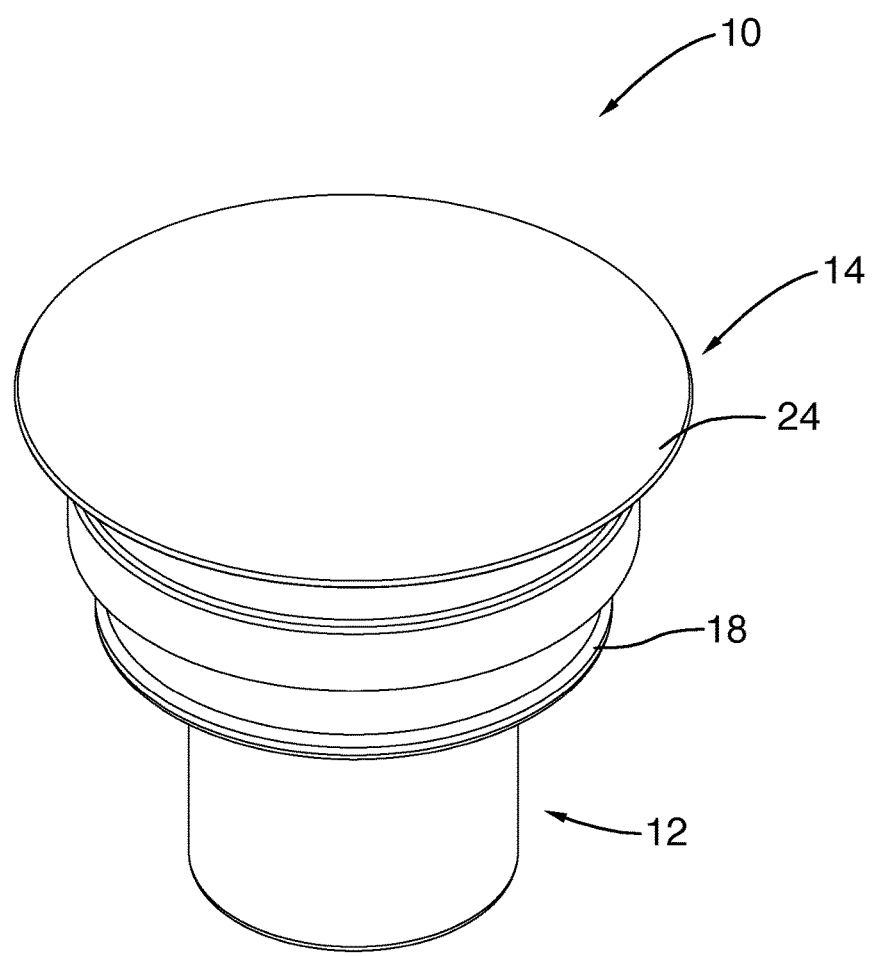
FIG. 1 is a perspective view of an electronic drain closure system in an open position, the electronic drain closure system comprising a drain fitting connectable to a container and an evacuation drain, a closure member and a coupling body for connecting the closure member to the drain fitting, in accordance with an embodiment.
Figure 2:
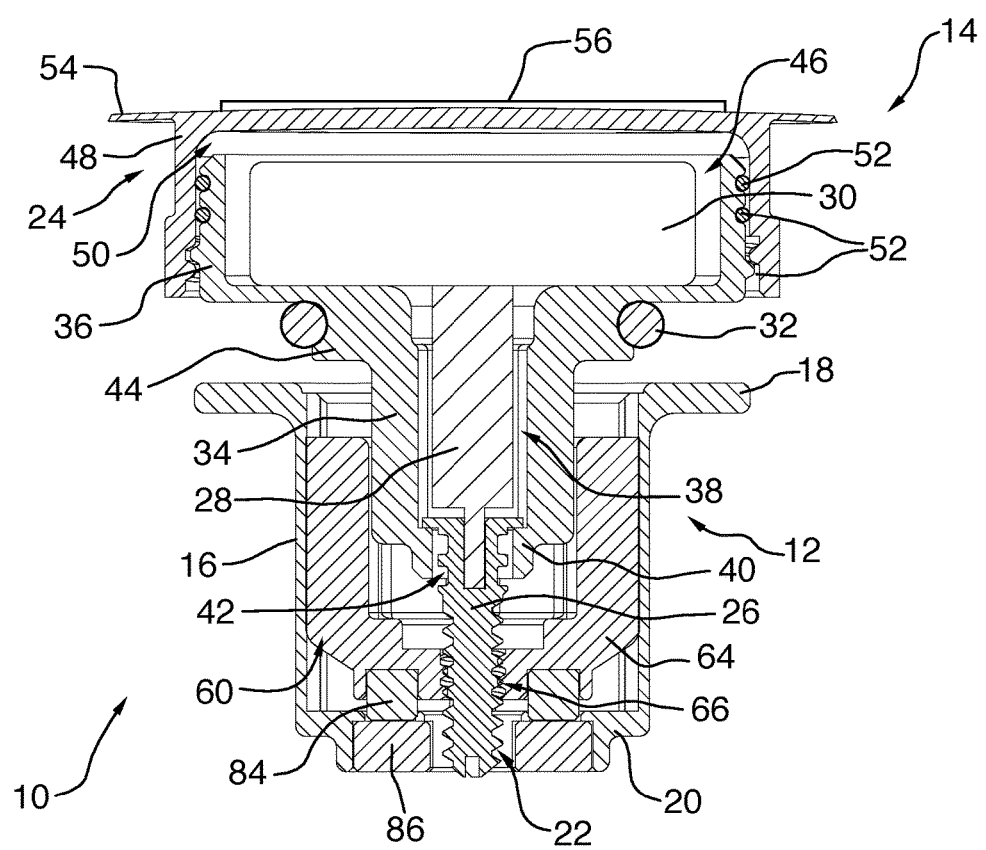
FIG. 2 is a cross-sectional view of the electronic drain closure system when in the open position.

FIGS. 1 and 2 illustrate an electronic drain closure system 10 when in an open position. The electronic drain closure system 10 comprises a drain fitting 12 and a closure member 14. The drain fitting 12 is adapted to be secured to a drain opening present in the bathtub for evacuating water contained in the bathtub. The closure member 14 is movable between an open position in which water may flow in the drain fitting and a closed position in which the closure member 14 substantially hermetically closes the drain fitting so that no water may flow into the drain fitting.

In the embodiment illustrated in FIG. 2, the closure member 14 is in the open position. As illustrated, the drain fitting 12 comprises a tubular body 16 extending between a top end and a bottom end. The drain fitting 12 also comprises a flange 18 extending radially and outwardly from the top end of the tubular body 16. In order to secure the drain fitting to a bathtub, the drain fitting 12 is inserted into the drain opening of the bathtub until the flange 18 abuts against the wall of the bathtub that surrounds the drain opening. The bottom end of the drain fitting 12 is then connected to an evacuation drain for evacuating water. For example, the bottom end of the drain fitting 12 may be inserted into the evacuation drain. In this case, the outer diameter of the bottom end of the drain fitting may be chosen to substantially correspond to the internal diameter of the evacuation drain so that the bottom end of the drain fitting 12 snuggingly engages the evacuation drain when inserted therein. In another example, the evacuation drain may be inserted into the bottom end of the drain fitting 12. In this case, the internal diameter of the bottom end of the drain fitting 12 may be substantially equal to the external diameter of the evacuation drain so that the bottom end of the drain fitting 12 snuggingly engages the evacuation drain when evacuation drain is inserted into the drain fitting 12.

A wall 20 extends transversely through the interior chamber of the tubular body 16 at the bottom end thereof. The size and shape of the wall 20 are chosen so that the wall 20 does not extend through the entire cross-section of the tubular body 16 so that water may flow therethrough from the top end of the tubular body 16 to the bottom end in order to be evacuated via the evacuation drain.

In one embodiment, the wall 20 further comprises a threaded hole 22 which is positioned substantially at the center of the wall 20, as shown in the illustrated embodiment. In another embodiment, the hole 22 may not be threaded.

Figure 3:
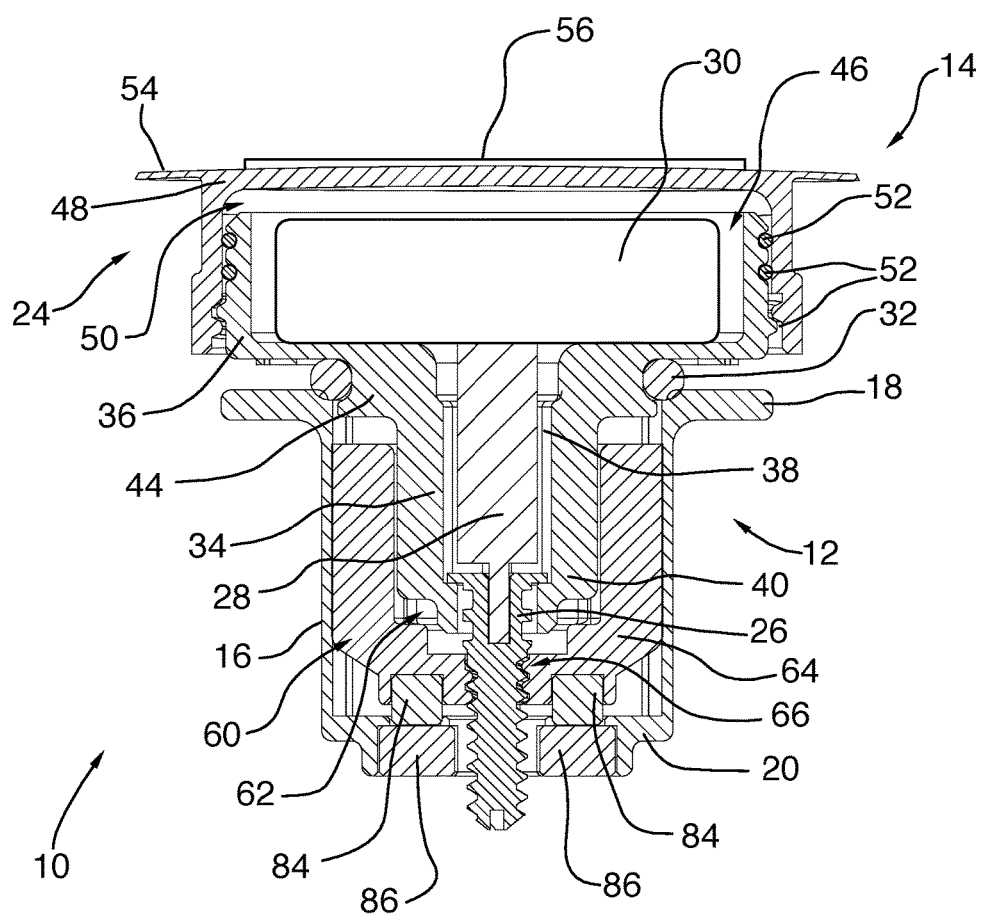
FIG. 3 is a cross-sectional view of the electronic drain closure system when in a closed position.

The closure member 14 is movably secured to the drain fitting 12 and is movable between an open position in which the closure member 14 is away from the drain fitting 12, as illustrated in FIG. 2, and a closed position in which the closure member 14 abuts against the drain fitting 12, as illustrated in FIG. 3. When the closure member 14 is in the open position, water may flow from the bathtub into the evacuation drain via the drain fitting 12. When the closure member 14 is in the closed position, water is prevented from flowing into the drain fitting 12.

In the illustrated embodiment, the closure member 14 comprises a casing 23, a cover 24, a drive screw 26, an electrical motor 28, a battery 30, a gasket 32, a controller (not shown), and a communication unit comprising an antenna for at least receiving signals (not shown). The casing 23 comprises a bottom casing portion 34 having a tubular shape and a top casing portion 36 having a tubular shape and being positioned on top of the bottom casing portion 34. The diameter of the bottom casing portion is chosen so that the bottom casing portion 34 be insertable into the coupling body 60. The bottom and top casing portions 34 and 36 may be seen as a hollow T-shaped body.

The bottom casing portion 34 comprises a motor receiving chamber 38 which extends from a top end thereof to a bottom wall 40 which closes the bottom end of the bottom casing portion 34. The bottom wall 40 of the bottom casing portion 34 is provided with a threaded hole 42 which emerges into the motor receiving chamber 38 and in which the drive screw 26 is rotatably inserted. The motor 28 is inserted into the motor receiving chamber 38 and the drive screw 26 is operatively connected to the motor 28 so that an activation of the motor 28 triggers a rotation of the drive screw 26. The portion of the drive screw 26 which is inserted into the threaded hole 42 is provided with at least one horizontal thread on its external surface, i.e. the threads are orthogonal to the longitudinal axis of the drive screw 26. Similarly, the threaded hole comprises at least one horizontal thread so that the activation of the motor 28 triggers a rotation of the drive screw 26 with respect to the casing 23 while preventing any translation of the drive screw relative to the casing 23. The bottom section of the drive screw 26 is provided with threads that are angled with respect to the longitudinal axis of the drive screw 26 to allow translation of the closure member 14 relative to the drain fitting 12 as described below.

The bottom casing portion 34 further comprises four protrusions 43 which each protrude outwardly from the external face of the bottom casing portion 34 and each extend longitudinally along at least a section of the length of the bottom casing portion 34. In the illustrated embodiment, the protrusions 43 are evenly positioned around the circumference of the top end of the bottom casing portion 34. However, it should be understood that other configurations may be possible. For example, the protrusions 43 may not be evenly distributed around the circumference of the bottom casing portion 34. It should also be understood that the number, shape, size, and/or position of the protrusions 43 may vary as long as the bottom casing portion 34 comprises at least one protrusion projecting from the outer surface of the bottom casing portion 34.

The bottom casing portion 34 further comprises a protrusion or flange 44 which extends radially and outwardly from the top end of the bottom casing portion 34 along the circumference thereof, and the circular gasket 32 is installed around the protrusion 44. The protrusion 44 may also be seen as being part of the top casing portion 36. In the illustrated embodiment, the diameter of the protrusion 44 is chosen so as to be equal to or less than the internal diameter of the drain fitting 12. In this case and when the drain closure system is in a closed position, the bottom end of the protrusion penetrates into the drain fitting 12 and the gasket 32 abuts against the flange 18 of the drain fitting 12 in order to close the drain fitting 12. In the illustrated embodiment, the diameter of the top casing portion 36 is greater than that of the protrusion 44.

The top casing portion 36 comprises a battery receiving chamber 46 which extends from the top end of the top casing portion 34 to a bottom end thereof and a bottom wall 45 is used for securing the bottom casing portion 34 to the top casing portion 36. The wall 45 has a first end secured to the flange 44 of the bottom casing portion 34 and a second and opposite end secured to the bottom end of the top casing portion 36. As illustrated in FIG. 2, the motor receiving chamber 38 emerges into the battery receiving chamber 46 so that the battery 30 be electrically connected to the motor 28 for powering the motor 28.

The cover 24 is used for enclosing at least the electrical motor 28 and the battery 30 within the casing 23 while preventing water from propagating within the motor receiving chamber 38 and the battery receiving chamber 46. The cover 24 comprises a cylindrical body 48 provided with a recess 50 which extends from the bottom of the cylindrical body 48 towards a top wall thereof. The recess 50 is sized and shaped so as to receive the top casing portion 36 therein. Circular gaskets 52 are inserted around the lateral surface of the top casing portion 36 between the top casing portion 36 and the cover 24 so as to prevent any water from flowing into the top casing portion 36 and thereby protect the electrical components contained into the closure assembly 14 from water.

In one embodiment, the cover 24 may be removably secured to the top casing portion 36 by friction forces created when the cover 24 is positioned on top and over the top casing portion 36.

In another embodiment, the lateral and external face of the top casing portion 36 may be threaded and the internal face of the cover 24 may also be threaded so that the cover 24 may be secured to the top casing portion 36 by screwing the cover 24 on the top casing portion 36.

It should be understood that any adequate system/method for removably and hermetically securing the cover 24 to the top casing portion 36 may be used. For example, screws may be used.

In one embodiment, the cover 24 is further provided with a flange 54 that extends radially and outwardly from the top of the cover 24.

In the same or another embodiment, the cover 24 is further provided with a solar panel 56 comprising photovoltaic cells that is secured to the top wall of the cover 24. In this case, the solar panel is electrically connected to the battery 30 and the battery 30 is a rechargeable battery adapted to be recharged by the solar panel 56.

In one embodiment, the electronic drain closure system 10 comprises a guiding or coupling body 60 insertable into the drain fitting 12. In one embodiment, the coupling body 60 is fixedly securable to the drain fitting 12. In another embodiment, the coupling body 60 is removably securable to the drain fitting 12. The coupling body 60 is sized and shaped so that water may flow through the drain fitting while the coupling body 60 is inserted into the drain fitting 12. For example, the coupling body 60 may has a cylindrical shape and be provided with at least one hole extending along its entire length to allow water to flow therethrough.

Figure 4:
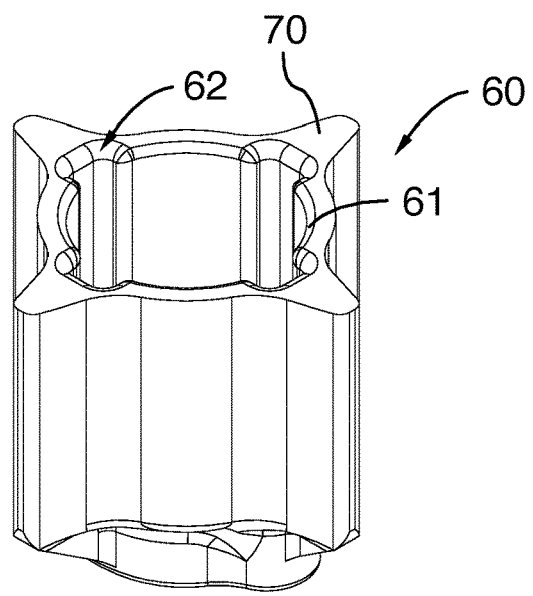
FIG. 4 is a perspective view of the coupling member of the electronic drain closure system of FIG. 1, in accordance with an embodiment.
Figure 5:
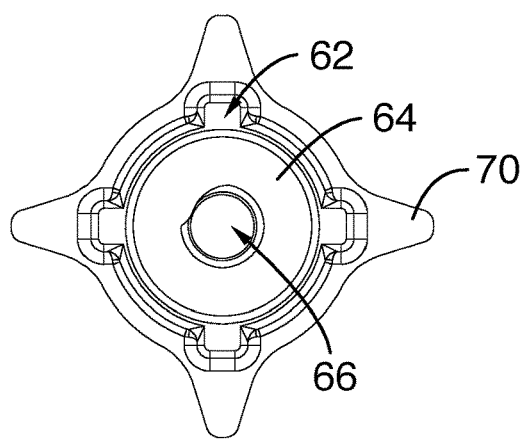
FIG. 5 is a top view of the coupling member of FIG. 4.
Figure 6:
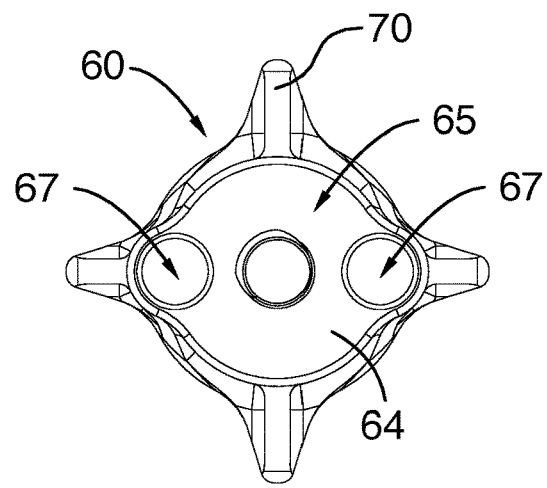
FIG. 6 is a bottom view of the coupling member of FIG. 4.
Figure 7:
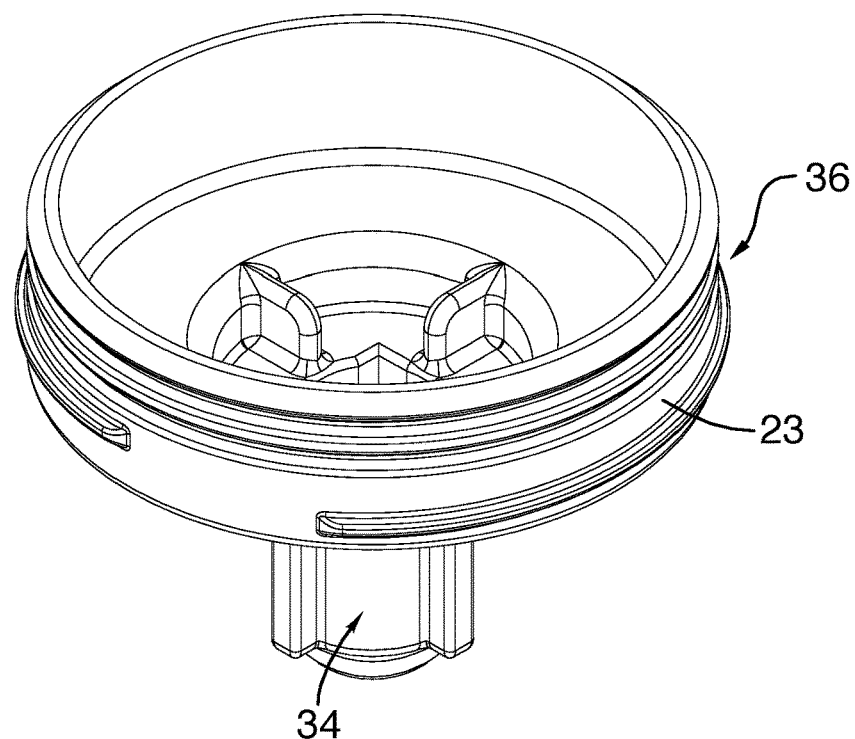
FIG. 7 is a perspective view of the closure member of the electronic drain closure system of FIG. 1 with the cover omitted, in accordance with an embodiment.
Figure 8:
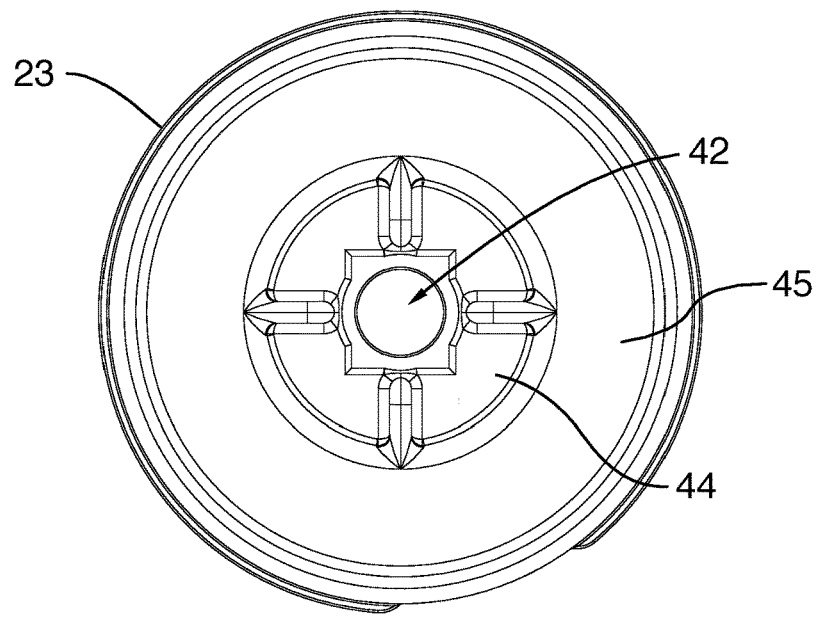
FIG. 8 is a top view of the closure member of FIG. 7.
Figure 9:
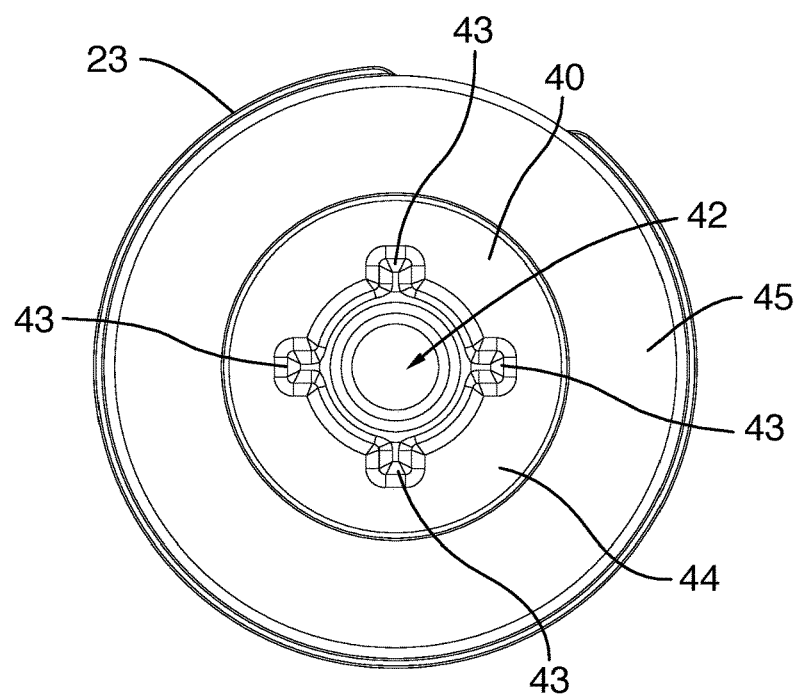
FIG. 9 is a bottom view of the closure member of FIG. 7.

As illustrated in FIGS. 4-6, the coupling body 60 comprises a tubular body 61 extending between a top end and a bottom end and a wall 64 closes the bottom end of the tubular body 61. The tubular body defines a chamber adapted to receive the bottom casing portion 34 of the closure member 14 therein. The internal diameter of the tubular body 61 substantially corresponds the external diameter of the bottom casing portion 34 of the closure member 14 and the internal face of the tubular body 61 comprises four internal recesses 62 each positioned, sized and shaped for receiving a respective protrusion 43 of the bottom casing portion 34 of the closure member 14. In the illustrated embodiment, the internal recesses 62 are evenly distributed around the circumference of the internal face of the tubular body 61 and each extend along substantially the entire length of the internal face of the tubular body 61. It should be understood that other configurations may be possible depending on the number, size, shape and position of the protrusions 43.

The bottom wall 64 of the coupling body 60 is provided with a threaded aperture 66 in which the drive screw 26 is inserted. The thread of the aperture 66 is angled so as to correspond the angled thread of the drive screw 26. The bottom face 65 of the bottom wall 64 is also provided with two magnet receiving recesses 67 each adapted to receive a respective magnet therein.

The tubular body 61 is further provided with four protrusions 70 which each project outwardly and radially from the external face thereof. The protrusions 70 each extend along a section of the length of the tubular body 61. The protrusions 70 are evenly distributed around the circumference of the tubular body 61 so that each protrusion 70 faces a respective recess 62. It should be understood that other configurations may be possible as long as the tubular body 61 is provided with at least one protrusion projecting from the outer face of the tubular body 61. For example, the number, shape, size and position of the protrusions 70 may vary. The space defined between two adjacent protrusions 70 allows water to flow from the bathtub into the evacuation drain.

Figure 10:
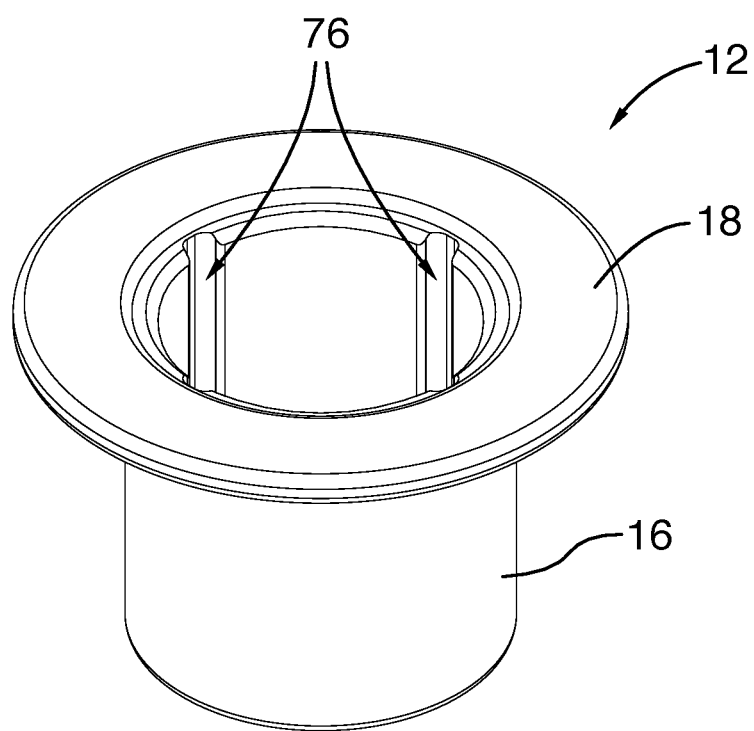
FIG. 10 is a perspective view of the drain fitting of the electronic drain closure system of FIG. 1, in accordance with an embodiment.
Figure 11:
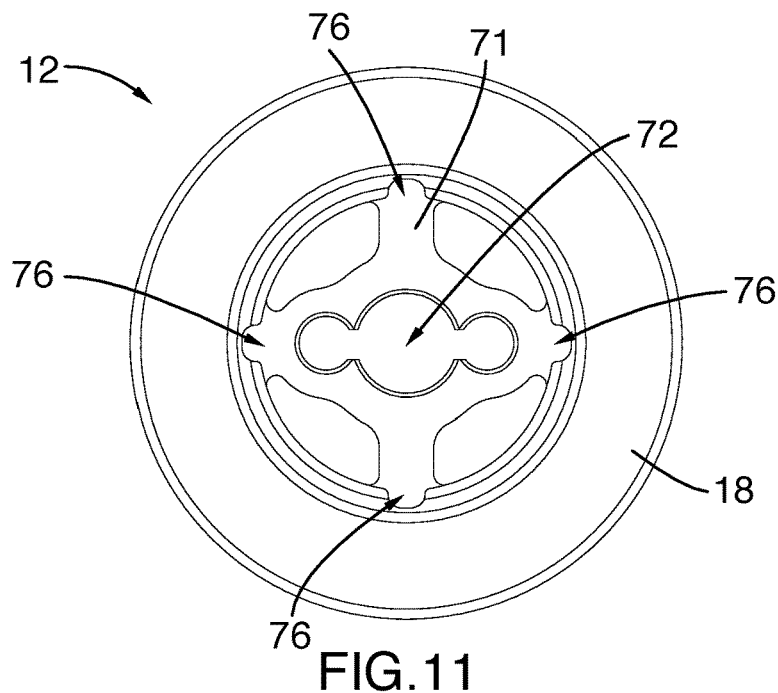
FIG. 11 is a top view of the drain fitting of FIG. 10.
Figure 12:
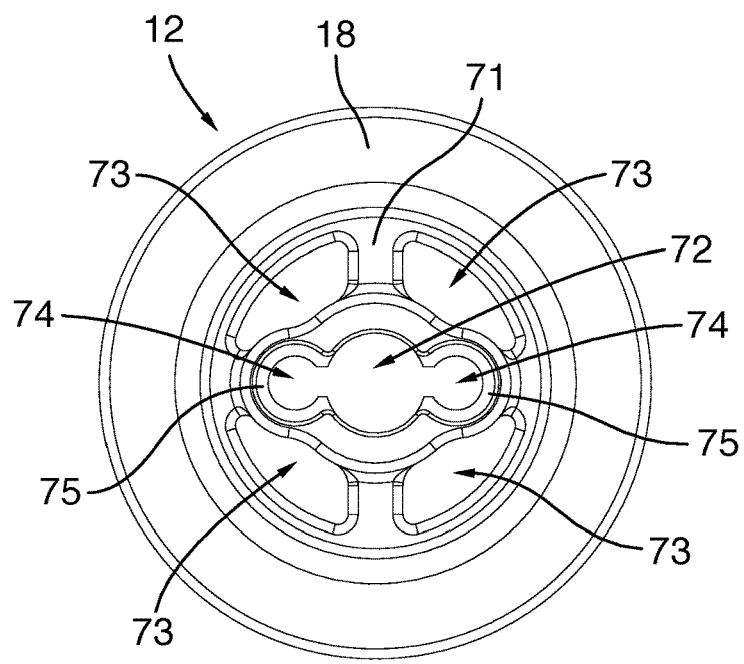
FIG. 12 is a bottom view of the drain fitting of FIG. 10.

As illustrated in FIG. 10-12, the drain fitting 12 comprises a tubular body 16 extending between a top end and a bottom end. The internal diameter of the tubular body 16 is chosen so as to receive the coupling body 60 therein. The internal face of the tubular body 16 is provided with four recesses 68 each sized and shaped for receiving a respective protrusion 70 therein. A flange 18 extends radially and outwardly from the top end of the tubular body 16 around the circumference thereof.

The drain fitting 12 further comprises a bottom wall 71 at the bottom end of the tubular body 16. The bottom wall 71 comprises a central threaded aperture 72 for receiving the drive screw 26 therein. It should be understood that the central aperture 72 may not be threaded. The bottom wall 71 further comprises four openings 73 which each extends therethrough for allowing water to flow from the bathtub into the evacuation drain. The bottom wall 71 also comprises two magnet receiving openings 74 which each extend from the top of the bottom wall 71 to its bottom end. A flange 75 projects from the top end of the bottom wall 71 within the magnet receiving aperture and extends along a portion of the circumference of the magnet receiving opening 74. The flange 75 allows maintaining a magnet into the magnet receiving aperture 74 and prevents the magnet from moving into the cavity defined by the tubular body 61.

The internal face of the tubular body 61 is provided with four recesses 76 which each extend along the length of the tubular body 61. The recesses 76 are evenly distributed around the circumference of the internal face of the tubular body 61 so as to each receive therein a respective protrusion 70 It should be understood that the position, shape, size and number of recesses 76 may vary depending on the number, size, shape and position of the protrusions 70.

In an embodiment in which it is removably securable to the drain fitting 12, the coupling body 60 may comprise two magnets 84 each inserted into a respective magnet receiving recess 67, and the drain fitting 12 may also be provided with two magnets 86 each inserted into a respective magnet receiving aperture 74. The magnet receiving recesses 67 and the magnet receiving apertures 74 are positioned so that each magnet 84 faces a respective magnet 86 when the coupling body 60 is inserted into the drain fitting 12. AS a result of the magnetic force between the magnets 84 and 86, the coupling body 60 is removably securable to the drain fitting 12. The magnetic force generated between the magnets 84 and 86 allow preventing any translation movement of the coupling body 60 relative to the drain fitting 12. It should be understood that the number of magnets, magnet receiving recesses and magnet receiving apertures may vary. Similarly, the position, size, shape of the magnets, the magnet receiving recesses and the magnet receiving apertures may vary.

In another embodiment, the coupling body 60 may be fixedly secured within the drain fitting 12. In this case, the magnet receiving recesses 67, the magnet receiving apertures 74 and the magnets 84 and 86 may be omitted. Any adequate method for fixedly securing the coupling body 60 to the drain fitting 12 may be used.

In one embodiment, the coupling body 60 may be omitted. In this case, the closure member 14 is movably secured to the drain fitting 12 thanks to the drive screw 26 which threadingly engages the threaded aperture 72 of the drain fitting. The protrusions 43 may be sized and shaped for being received in a respective recess 76 so as to prevent any rotation of the closure member 14 relative to the drain fitting 12.

In order to assemble the electronic drain closure system 10, the coupling body 60 is inserted into the drain fitting 12 so that each protrusion 70 be received in a respective recess 76. Once the protrusions 70 are each received in a respective recess 76, the coupling body 60 cannot rotate relative to the drain fitting. Then the casing 23 of the closure member 14 is inserted into the coupling body. This is done by inserting each protrusion 43 into a respective recess 62 and screwing the drive screw into the threaded aperture 66 of the coupling body 60 and the threaded aperture 72 of the drain fitting 12.

Then the electrical motor 28, the battery 30, the controller and the communication unit are inserted into the casing 23 and operatively connected together and to the drive screw 26. The cover 24 is then secured to the casing 23, thereby hermetically enclosing the components installed in the casing 23. The electronic drain closure system 10 can then be secured to the bathtub and fluidly connected to the evacuation drain.

It should be understood that the order of the above steps is exemplary only. For example, the different components to be installed in the casing may be first positioned in the casing 23. Then the cover 24 may be secured to the casing 23 before inserting the closure member 14 into the coupling body 60 and inserting the coupling body into the drain fitting 12.

In order to selectively open and close the electronic drain closure system 10, the electrical motor 28 is activated which triggers a rotation of the drive screw 26 in a respective rotation direction. The drive screw 26 then rotates relative to the casing 23 but does not translate relative to the casing 23. Since the coupling body 60 cannot translate and rotate relative to the drain fitting 12 and the drain fitting 12 is fixedly secured to the bathtub, the rotation of the drive screw 26 triggers a translation of the closure member 14 into the coupling body 60. Depending on the rotation direction of the drive screw 26, the closure member will translate upwardly to allow water to flow from the bathtub into the evacuation drain or downwardly to abut the gasket 32 against the top end of the drain fitting 12, thereby preventing water to flow from the bathtub into the evacuation drain.

In order to operate the electronic drain closure system 10, a wireless command signal is sent from a remote control such as a mobile device to the electronic drain closure system 10. The wireless communication unit receives the command signal which is transmitted to the controller of the electronic drain closure system 10. If the command indicates that the electronic drain closure system 10 must be closed, the controller activates the motor 28 to downwardly translate the bottom casing portion 34 into the coupling body 60. The electronic drain closure system 10 is then closed as illustrated in FIG. 3. In this position, the gasket 32 abuts against the casing 23 and the drain fitting 12, thereby preventing water from flowing into the drain fitting 12. If the command indicates that the electronic drain closure system 10 must be opened, the controller activates the motor 28 to upwardly translate the bottom casing portion 34

In one embodiment, the electronic drain closure system 10 further comprises a sensor for detecting the presence of a liquid such as water. In this case, the controller is further configured to activate the communication unit, i.e. powering the communication unit only when the sensor detects the presence of water in the bathtub or in the vicinity of the electronic drain closure system 10, depending on the location of the sensor. In this case, the sensor may continuously or periodically send signals indicative of the presence and/or absence of water to the controller. When the signal sent by the sensor is indicative of the presence of water, the controller activates the communication unit by powering the communication unit which then listens to command signals to be sent from the remote control. When the signal sent by the sensor is indicative of the absence of water, the controller deactivates the communication unit by cutting the power to the communication unit, thereby saving energy stored in the battery by not depleting the battery when no water is detected.

Figure 13:
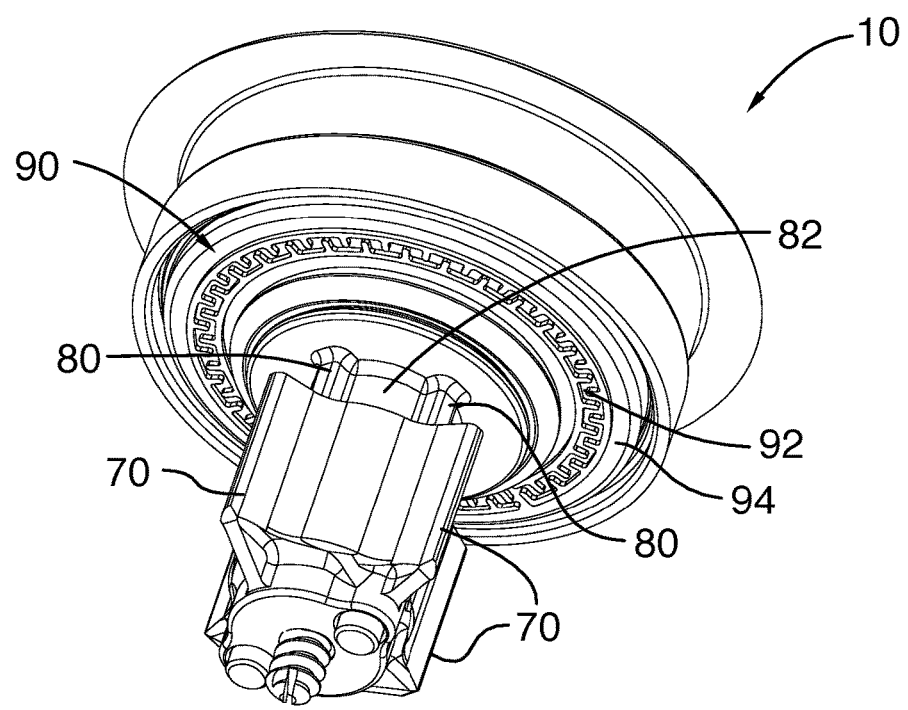
FIG. 13 is a perspective view of an assembly formed of the closure member and the coupling body of FIG. 1 the closure member being provided with a liquid sensor, in accordance with an embodiment.
Figure 14:
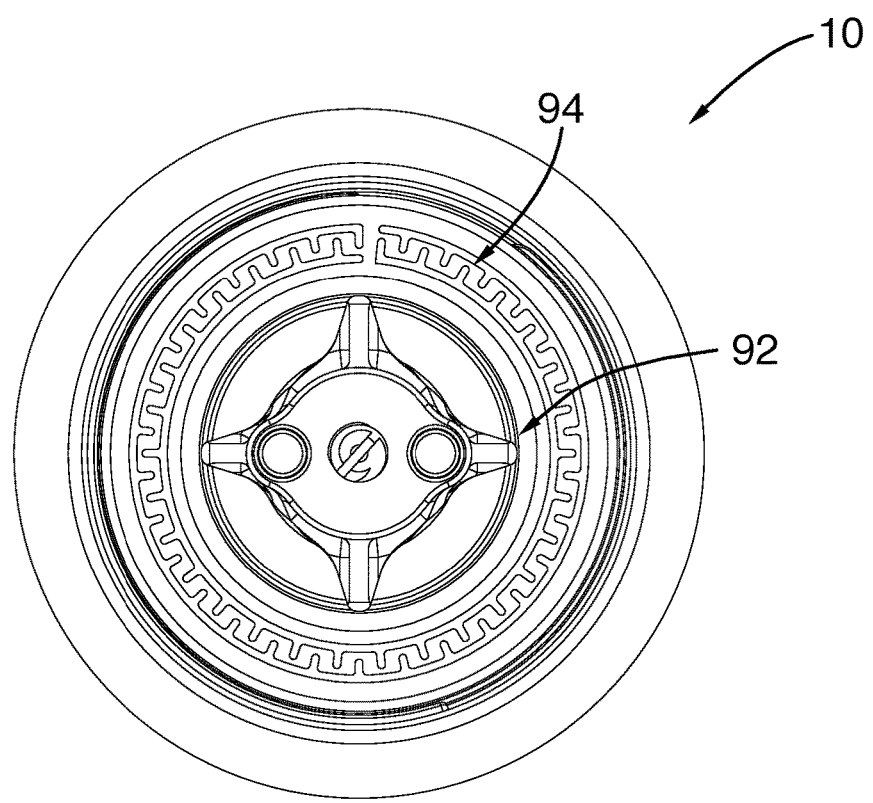
FIG. 14 is a bottom view of the assembly of FIG. 3.

FIGS. 13 and 14 illustrate one exemplary sensor 90 for detecting the presence of liquid such as water. The sensor 90 is located on the bottom face of the top casing portion 36. The sensor 90 comprises two circular and concentric electrical conductors 92 and 94 which are spaced apart by a given distance.

The electrical conductors 92 and 94 are part of an electrical circuit and form together a switch. An electrical current is applied to one of the conductors 92 and 94. Because of the gap of air between the two conductors 92 and 94, the electrical current cannot propagate into the other one of the conductors 92 and 94. However, when water is present between the two conductors 92 and 94 and because water is electrically conductive, the electrical current can flow between the two conductors 92 and 94, thereby closing the electrical circuit.

Therefore, when no water is present between the two conductors 94 and 92, no electrical current can flow between the two conductors 92 and 94 and the sensor 90 determines that no water is present and sends a signal indicative of the absence of water to the controller. When water is present between the two conductors 94 and 92, then the electrical current can flow between the two conductors 92 and 94 and the sensor 90 determines that the presence of water and sends a signal indicative of the presence of water to the controller.

It should be understood that the position of the sensor 90 may vary. For example, the sensor 90 may be located on the top face of the cover 24 around the optional solar panel 56.

It should also be understood that the sensor 90 is exemplary only and that any adequate sensor adapted to detect the presence of a liquid such as water may be used.

In one embodiment, the battery 30 may be omitted and the closure member 14 may be electrically connectable to a power source such as a grid.

Figure 15:
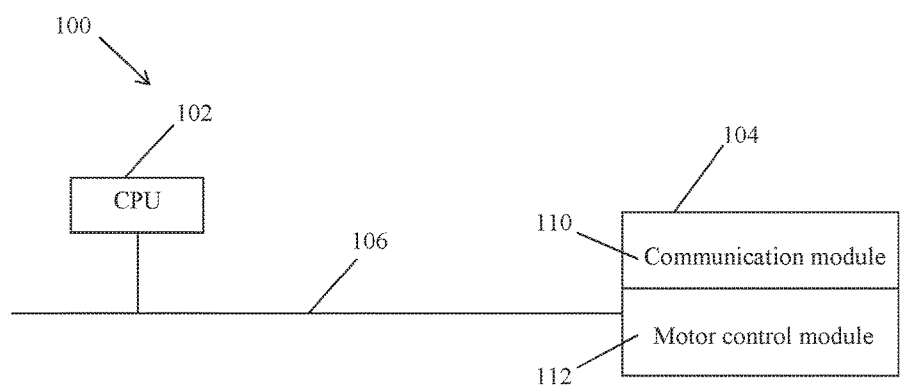
FIG. 15 is a block diagram illustrating a controller for controlling a water delivery system, in accordance with an embodiment.

FIG. 15 is a block diagram illustrating an exemplary controller 100 for controlling the water delivery system 10, in accordance with some embodiments. The processing module 100 typically includes one or more Computer Processing Units (CPUs) or Graphic Processing Units (GPUs) 102 for executing modules or programs and/or instructions stored in memory 104 and thereby performing processing operations, memory 104, and one or more communication buses 106 for interconnecting these components. The communication buses 106 optionally include circuitry (sometimes called a chipset) that interconnects and controls communications between system components. The memory 104 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 104 optionally includes one or more storage devices remotely located from the CPU(s) 102. The memory 104, or alternately the non-volatile memory device(s) within the memory 104, comprises a non-transitory computer readable storage medium. In some embodiments, the memory 104, or the computer readable storage medium of the memory 104 stores the following programs, modules, and data structures, or a subset thereof:

a communication module 110 for receiving and transmitting data and commands at least to the sensor and the battery to activate the communications unit; and a motor control module 112 for controlling the electrical motor.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 104 may store a subset of the modules and data structures identified above. Furthermore, the memory 104 may store additional modules and data structures not described above.

Although FIG. 15 shows a processing module 100, FIG. 15 is intended more as functional description of the various features which may be present in a management module than as a structural schematic of the embodiments described herein. In practice, and as recognized by those of ordinary skill in the art, items shown separately could be combined and some items could be separated.

While the present electronic drain closure system 10 is described in connection with a bathtub for selectively opening and closing an evacuation drain, it should be understood that the electronic drain closure system 10 may be used in connection with any adequate container for containing a liquid. For example, the electronic drain closure system 10 may be installed on a shower base, a swimming pool, or the like.

The embodiments of the invention described above are intended to be exemplary only. The scope of the invention is therefore intended to be limited solely by the scope of the appended claims.

We claim:

1. An electronic drain closure system comprising:
   a drain fitting securable to an opening present in a container for containing a liquid and to an evacuation drain for evacuating the liquid to be contained in the container; and
   a closure member movably connected to the drain fitting for selectively opening and closing the drain fitting, the closure member comprising:
      a casing;
      a motion device for selectively moving the casing relative to the drain fitting between an open position in which the casing is away from the drain fitting to allow the liquid from flowing from the container into the evacuation drain and a closed position in which the casing abuts against the drain fitting to prevent the liquid from flowing from the container into the evacuation drain;
      an electrical motor received in the casing for activating the motion device;
      a communication unit received in the casing for at least receiving a command indicative of one of an opening of the electronic drain closure system and a closure of the electronic drain closure system; and
      a controller for activating the electrical motor in accordance with the command received by the communication unit.

2. The electronic drain closure system of claim 1, further comprising a battery received in the casing for powering at least the electrical motor and the controller.

3. The electronic drain closure system of claim 1, wherein the battery is a rechargeable battery.

4. The electronic drain closure system of claim 3, further comprising a solar panel installed on the casing for recharging the rechargeable battery.

5. The electronic drain closure system of claim 1, further comprising a liquid sensor for detecting a presence of the liquid adjacent the closure member; wherein the controller is further configured for activating the communication unit when the sensor detects the presence of the liquid and deactivating the communication unit when the sensor detects an absence of liquid.

6. The electronic drain closure system of claim 5, wherein the liquid sensor is secured to the closure member.

7. The electronic drain closure system of claim 1, wherein the motion device comprises a drive screw rotatably secured to the casing, a rotation of the drive screw triggering motion of the casing.

8. The electronic drain closure system of claim 7, wherein the drain fitting comprises a first tubular body extending between a first top end and a first bottom end and a first bottom wall secured at the first bottom end of the first tubular body, the first top end being securable to the container and the first bottom end being securable to the evacuation drain, the first bottom wall comprising at least one evacuation aperture for allowing the liquid to flow therethrough and a first threaded hole for receiving the drive screw.

9. The electronic drain closure system of claim 8, wherein the drain fitting further comprises a flange projecting from the first top end of the first tubular body.

10. The electronic drain closure system of claim 8, wherein the first tubular body comprises at least one first recess extending on an inner face thereof along at least a section of a length thereof.

11. The electronic drain closure system of claim 10, further comprising a coupling member insertable into the first tubular body of the drain fitting, the coupling member comprising a second tubular body extending between a second top end and a second bottom end, the coupling member further comprising a second bottom wall secured at the second bottom end and comprising a second threaded hole for receiving therein the drive screw.

12. The electronic drain closure system of claim 11, wherein the coupling member further comprises at least first protrusion each receivable into a respective one of the at least one first recess for preventing a rotation of the coupling member relative to the drain fitting.

13. The electronic drain closure system of claim 11, wherein the coupling member is fixedly secured to the drain fitting.

14. The electronic drain closure system of claim 11, wherein the coupling member is removably secured to the drain fitting.

15. The electronic drain closure system of claim 14, wherein the drain fitting further comprises at least one first magnet and the coupling member further comprises at least one second magnet, each one of the at least one first magnet interacting with a respective one of the at least one second magnet for removably securing the coupling member into the drain fitting.

16. The electronic drain closure system of claim 11, wherein the second tubular body further comprises at least one second recess on an internal face thereof extending along at least a section of a length thereof.

17. The electronic drain closure system of claim 16, wherein the casing comprises a hollow T-shaped body comprising a bottom portion and a top portion and a third bottom wall located at a bottom of the hollow T-shaped body, the third bottom wall being provided with a screw receiving aperture through which the drive screw extends, the electrical motor being inserted into the bottom portion.

18. The electronic drain closure system of claim 16, wherein the bottom portion of the hollow T-shaped body comprises at least one second protrusion projecting from an external face thereof, each one of the at least one second protrusion being received into a respective one of the at least one second recess.

19. The electronic drain closure system of claim 17, further comprising a gasket surrounding the bottom portion of the closure member for substantially hermetically close the drain fitting when the closure member is in the closed position.

20. The electronic drain closure system of claim 17, further comprises a cover for covering the hollow T-shaped body.

* * * * *